Fig. 18
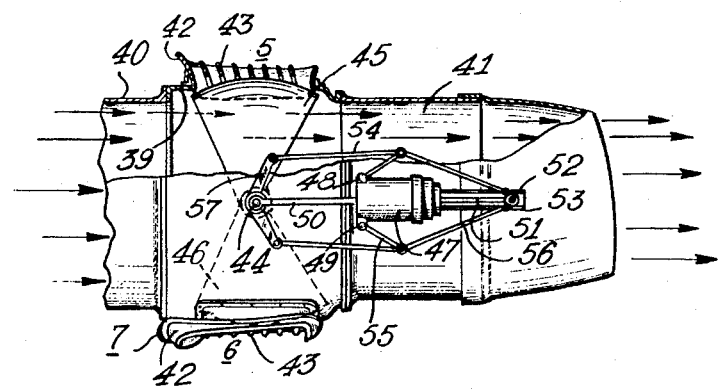
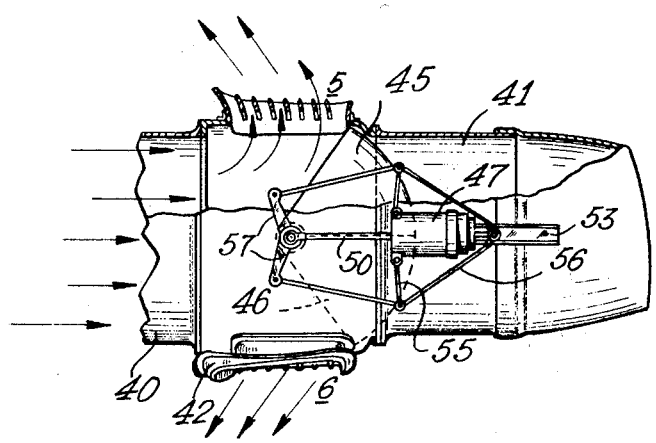
Fig. 19

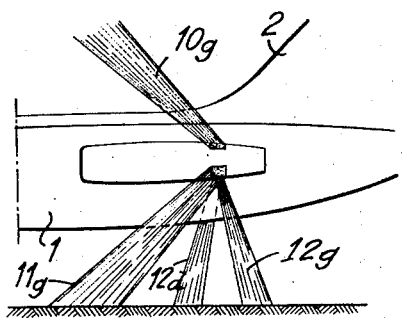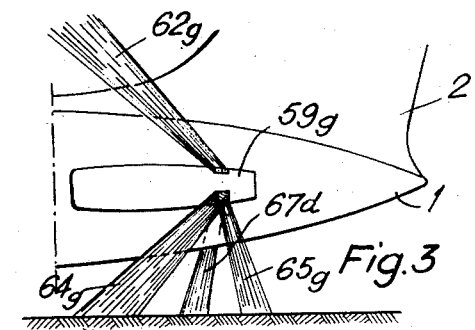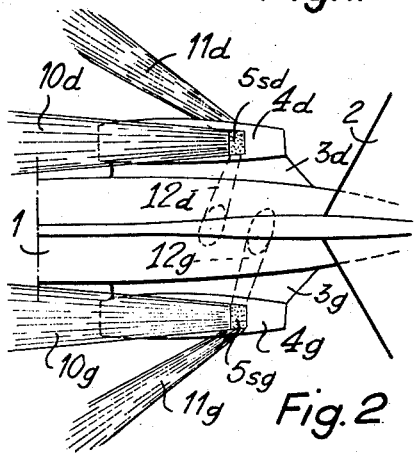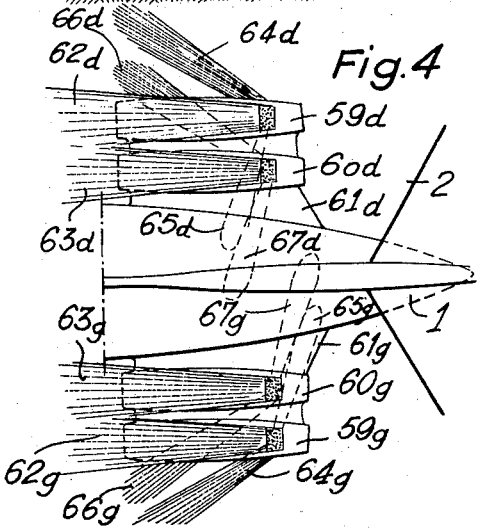
Fig. 1. Fig. 2. Fig. 3. Fig. 4. Fig. 5. Fig. 6.

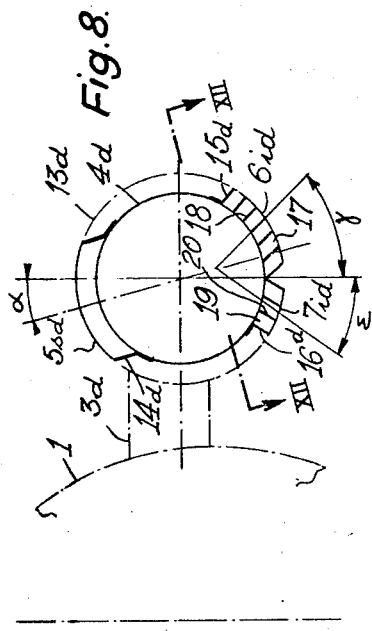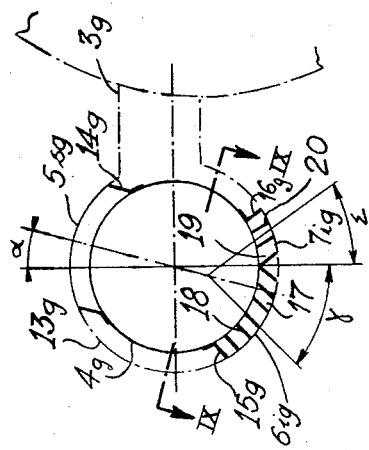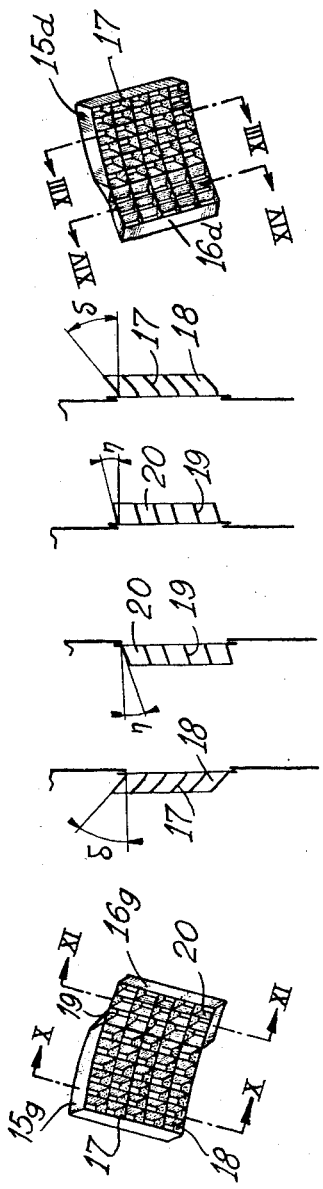

United States Patent Office
3,097,484
Patented July 16, 1963

3,097,484
THRUST REVERSERS FOR JET ENGINES
Joseph Gustave Etienne André and Jean Maurice Denis Rech, Toulouse, Haute-Garonne, France, assignors to Sud-Aviation Societe Nationale de Constructions Aeronautiques, Paris, France
Filed Dec. 29, 1960, Ser. No. 79,298
Claims priority, application France June 13, 1960
11 Claims. (Cl. 60—35.54)

The invention relates to improvements to devices for retarding in flight, particularly during landing, aircraft propelled by jet engines.

Such devices, known as thrust reversers, are executed according to different principles and their object is to change the direction of the jets of combustion gas escaping from the jet engine in order to modify the normal thrust of the jet engine. A symmetrical deflection of these jets in a forward direction generates a retarding counter-thrust.

In the case of a single-jet aircraft, such a deflection can easily be achieved in symmetrical fashion and without hampering stability of the aircraft.

In the case of a multi-jet aircraft, it is not possible to deflect the combustion gases onto the wall of the fuselage since this would lead to serious damage of the fuselage. Numerous solutions have been proposed which maintain the deflection of the gases symmetrical about the engine axis in order to avoid producing an upward, downward or lateral component of thrust. The deflection is generally produced in the form of two diametrically opposite laminar streams, distributed symmetrically in relation to the vertical plane and substantially parallel to the longitudinal plane of symmetry of the aircraft.

The installation of a jet reverser of this type on a multi-jet aircraft, on which it is impossible to provide the reversed jets along a horizontal plane, introduces serious problems with regard to the lower jet.

Although it may appear at first glance that it is necessary to arrange the jets in a plane which is substantially vertical this will cause the lower jet to strike the ground substantially in a vertical plane passing through the axis of the jet engine and this has three chief disadvantages.

(a) Re-cycling of the burnt gases, resulting in a great increase in the total temperature of the tailpipe and an attendant variation in the power, in addition to the possibility of surge if the jet engine is not adequately protected against re-entry of expended gases;

(b) Projection and intake of small stones, which can cause serious damage to the engine;

(c) Projection and intake of dust, causing a sand-blasting effect on the blades, which diminishes output of the engines and which raises the cost of overhaul of the engine.

On multi-jet aircraft, with thrust reversers of the type described in the U.S. Patent No. 2,863,620 in the name of André Charles René Vautier and assigned to Sud-Aviation Société Nationale de Constructions Aéronautiques, in which the two deflected jets lie in a vertical plane, the disadvantages referred to above manifest themselves in a serious way.

Numerous modifications were attempted among which the reversers were rotated about their respective axes to cause the outlets to be arranged in an oblique plane. However, this was not satisfactory since the fuselage and the tail assembly limit the angle of inclination of the oblique plane to very small angles.

In order to overcome these various drawbacks and to thereby allow the use of reversible-thrust jet engines, particularly on aircraft, without the attendant danger of the sucking in of gases and solids, the present invention has for an object a thrust reverser of asymmetrical ejection pattern for jet engines, usable on aircraft in particular, characterized by the fact that it comprises at least three deflecting ejection means for the combustion gases produced by the jet engine which are arranged about the conventional engine tailpipe, which ejects the gases to the rear of said engine. The deflecting ejection means are associated with means which control the deflecting means to render the same inoperative in flight and operative on landing. The control means also is effective to simultaneously suppress the action of said tailpipe during deflection of the gases. The direction and the mass flow of the gases through the deflecting means are established firstly, so that the zone of impact of the gases on the ground shall be laterally remote from a vertical plane passing through the axis of the jet engine, secondly, the deflected jets shall be clear of and not encounter the aircraft structure and, thirdly, the deflected jets shall have a resultant which does not have a component of thrust lying in a plane perpendicular to the axis of the engine while said resultant is directed.

The description which follows with reference to the accompanying drawings, given by way of example only and not in a limiting sense, will give a clear understanding of how the invention may be performed and will reveal yet further particularities thereof.

In the drawings,

FIGS. 1 and 2 are diagrammatic partial elevational and plan views (respectively) of an aircraft equipped with two lateral jet engines mounted directly on the fuselage, said jet engines being fitted with thrust reversers according to the invention.

FIGS. 3 and 4 are diagrammatic partial elevational and plan views (respectively) of an aircraft equipped with two pairs of lateral jet engines mounted directly on the fuselage, said jet engines being fitted with thrust reversers according to the invention.

FIGS. 5 and 6 are diagrammatic partial elevational and plan views (respectively) of an aircraft equipped with two lateral jet engines mounted on the wings, said jet engines being fitted with thrust reversers according to the invention.

FIG. 8 is a diagrammatic section, through a vertical plane perpendicular to the longitudinal plane of symmetry of the aircraft, of one embodiment of the jet engines of an aircraft according to FIGS. 1 and 2.

FIG. 9 is a perspective view of the lower ejection ducts of the port turbojet in FIG. 8, taken through the line IX—IX in FIG. 8.

FIGS. 10 and 11 are sectional views along lines X—X and XI—XI respectively in FIG. 9.

FIG. 12 is a perspective view of the lower ejection ducts of the starboard jet engine in FIG. 8, taken along line XIII—XIII in FIG. 8.

FIGS. 13 and 14 are sectional views along lines XIII—XIII and XIV—XIV respectively of FIG. 12.

FIGS. 18 and 19 are diagrammatic lateral views partially cut away of the port jet engine in FIG. 8 and the obturating means and associated obturation control means, shown in the in-flight and landing positions respectively.

Figure 7:
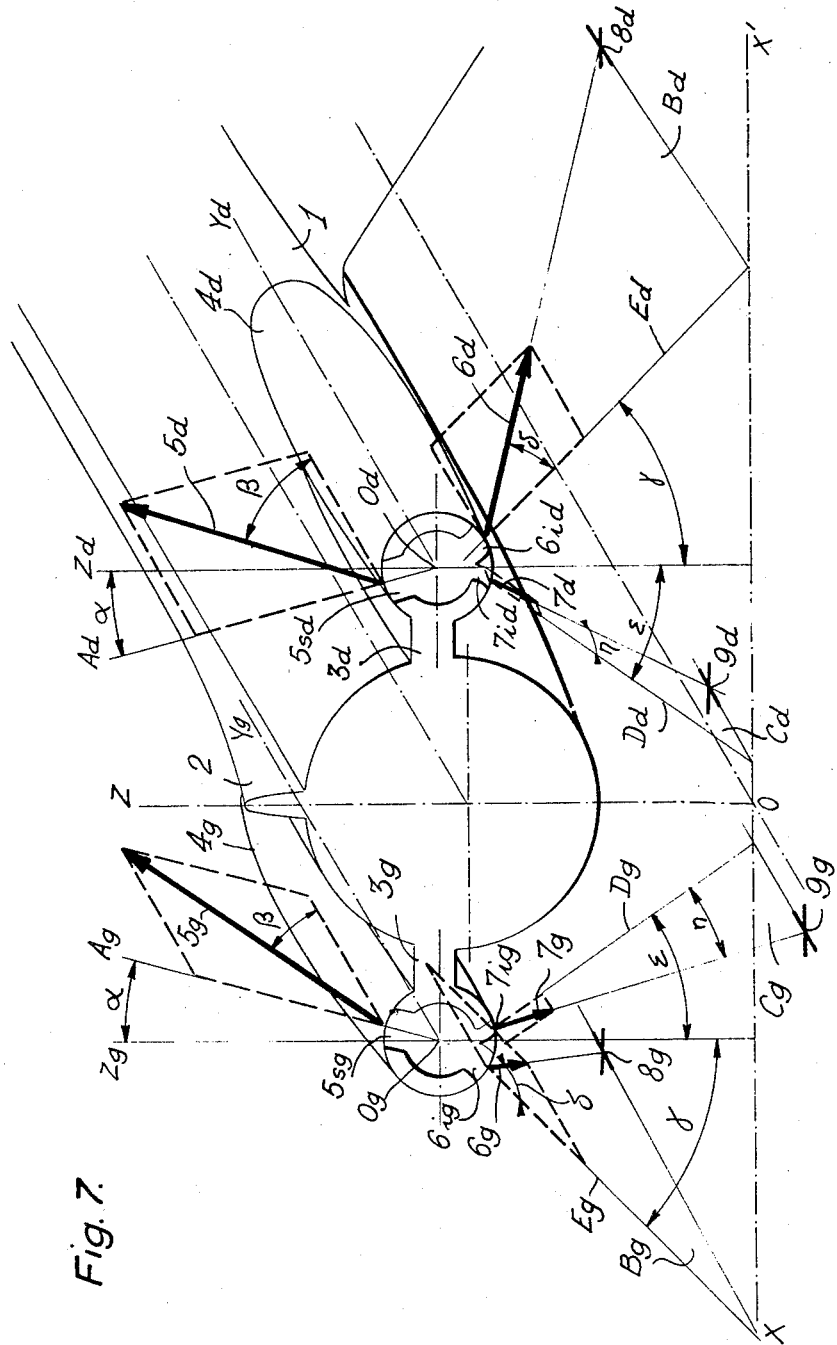
FIG. 7 is an explanatory diagram of the arrangement of the deflected jets on an aircraft of the type illustrated in FIGS. 1 and 2.

Referring now to the diagrammatic illustrations in FIGS. 1, 2 and 7, the aircraft shown comprises a fuselage 1 equipped with tail surfaces 2 and carries, through the medium of outriggers $3g$ and $3d$, two lateral jet engines $4g$ and $4d$. With a view to retarding the aircraft when it prepares to land, these jet engines comprise upper jet-deflection outlets $5sg$ and $5sd$ and two lower jet-deflection outlets. These lower outlets comprise, for the jet engine $4g$, a main outlet $6g$ directed outboardly and a compensating outlet $7ig$ directed inboardly. Similarly, the lower outlets of the jet engine $4d$ comprises an outboardly directed main outlet $6id$ and an inboardly directed compensating outlet $7id$.

As is more clearly illustrated in FIG. 7, in which the aircraft is assumed to be cut by a vertical plane OXX'Z perpendicular to its longitudinal plane of symmetry and passing substantially through the centers of the three deflected ejection jets and intersecting the ground along the line X—X', the three deflected jets of each of jet engines $4g$ and $4d$ have directions which are determined so as to obtain a zero resultant force of the three jets along any direction pertaining to said vertical plane OXX'Z and a resultant force directed forwardly along the corresponding vertical plane $Og\ Yg\ Zg$ or $Od\ Yd\ Zd$ passing respectively through the axis $Og\ Yg$ or $Od\ Yd$ of the corresponding jet engine, which resultant projects forwardly on said axis $Og\ Yg$ or $Od\ Yd$. The jets emerging from the upper outlets $5sg$ and $5sd$ have axes $5g$ and $5d$ which are respectively contained in planes $Og\ Yg\ Ag$ and $Od\ Yd\ Ad$ which are radial with respect to the jet engines $4g$ and $4d$ and inclined towards the fuselage at an angle $\alpha$ relative to the vertical planes $Og\ Yg\ Zg$ and $Od\ Yd\ Zd$ respectively. In addition, in said radial planes these jets $5g$ and $5d$ are inclined forwardly at an acute angle $\beta$ relative to the horizontal.

Similarly, the axes $6g$ and $6d$ of the lower outboardly directed main jets are contained in planes $Bg$ and $Bd$ inclined at an angle $\gamma$ relative to the vertical planes $Og\ Yg\ Zg$ and $Od\ Yd\ Zd$. In said inclined planes they are furthermore inclined forwardly at an acute angle $\delta$ relative to the intersection lines $Eg$ and $Ed$ of said planes $Bg$ and $Bd$ with the vertical plane OXZ. These jets encounter the ground at zones about the intersection points $8g$ and $8d$ of the axes $6g$ and $6d$, i.e. outwards laterally to and remote from the jet engines, thereby avoiding the re-cycling of burnt gases or the intake of stones or dust.

The axes $7g$ and $7d$ of the inboardly directed lower compensating jets are contained in planes $Cg$ and $Cd$ forming an angle $\epsilon$ with the vertical planes $Og\ Yg\ Zg$ and $Od\ Yd\ Zd$. The axis $7g$ is moreover inclined to the rear on the plane $Cg$ at an acute angle $\eta$ relative to the intersection line $Dg$ of the plane $Cg$ with the vertical plane OXZ, while the axis $7d$ is inclined forward at an acute angle $\eta$ relative to the intersection line $Dd$ of the plane $Cd$ with the vertical plane OXZ. The angles $\eta$ are small in comparison with the angles $\gamma$.

In addition, the cross-sections of outlets $7ig$ and $7id$ are smaller than those of outlets $6ig$ and $6id$ so that the outflow of combustion gas from these latter outlets is notably greater than that from outlets $7ig$ and $7id$ whose jets serve for compensation only and provide virtually no reversing thrust. Thus in an embodiment such as the one illustrated in FIG. 7, the mass flow of the upper jet is 0.5, that of the lower outboard jet 0.338 and that of the lower inboard jet 0.162.

The angles $\alpha$, $\beta$, $\gamma$, $\delta$, $\epsilon$ and $\eta$ are determined, on the one hand, according to the profiles of the aircraft and the relative positions of the outlets relative to those profiles and, on the other hand, by calculation in the case of at least one of those angles, with due regard for the various outlet sections, so that the resultant thrusts obtained from the three jets of each jet engine shall be zero for any direcion pertaining to the vertical plane OXZ, a condition which is indispensable to maintain balance in the event of failure of one of the jet engines. For this purpose the lower compensating ejection means for each jet engine equilibrates the lateral thrust generated by the asymmetry of the upper and main lower ejection means.

The axes $7g$ and $7d$ are directed slightly rearwardly and forwardly, respectively, in order to avoid interaction, beneath the fuselage, of the inboard jets which meet the ground in zones close to the intersection points of these axes on the ground at $9g$ and $9d$ respectively.

The resultant jets are shown in FIGS. 1 and 2 at $10g$ and $10d$ respectively for the upper jets emerging from outlets $5sg$ and $5sd$, at $11g$ and $11d$ for the lower main jets emerging from outboard outlets $6ig$ and $6id$, and at $12g$ and $12d$ for the lower compensating jets emerging from inboard outlets $7ig$ and $7id$.

In the embodiment illustrated diagrammatically in FIGS. 8 through 14, the thrust reversers are of the so-called "cascade" type and consist of elements well-known per se interposed between the jet engines $4g$ and $4d$ and their ejection nozzles. These elements are carried by cylindrical bodies $13g$ and $13d$, inside each of which are arranged three ducts of different sections. The upper ducts $14g$ and $14d$ supply the upper outlets $5sg$ and $5sd$. The lower ducts consisting of $15g$ and $15d$, on the one hand, and $16g$ and $16d$, on the other, supply the lower outlets $6ig$, $6id$ and $7ig$, $7id$ respectively. These ducts are fixed around apertures provided in the body of the thrust reverser.

As shown in FIGS. 8, 9, 10, 12 and 13, the lower ducts $15g$ and $15d$ are provided with vane-boxes of a type well-known per se, acting as deflecting means and comprising vanes $17$ separated by partitions $18$ inclined at an angle $\gamma$ relative to the vertical plane through the jet engine axis said vanes being in turn inclined forward at an angle $\delta$ relative to the section plane of FIG. 8. Ducts $16g$ and $16d$ in FIGS. 8, 9, 11, 12 and 14 likewise comprise deflector grids consisting of vanes $19$ separated by vertical partitions $20$ whose mean inclination relative to the vertical plane through the jet engine axis is equal to the angle $\epsilon$. The vanes $19$ of duct $16g$ are rearwardly inclined at an angle $\eta$ relative to the section plane of FIG. 8, while those of duct $16d$ are inclined forwardly at an identical angle.

Figure 15:
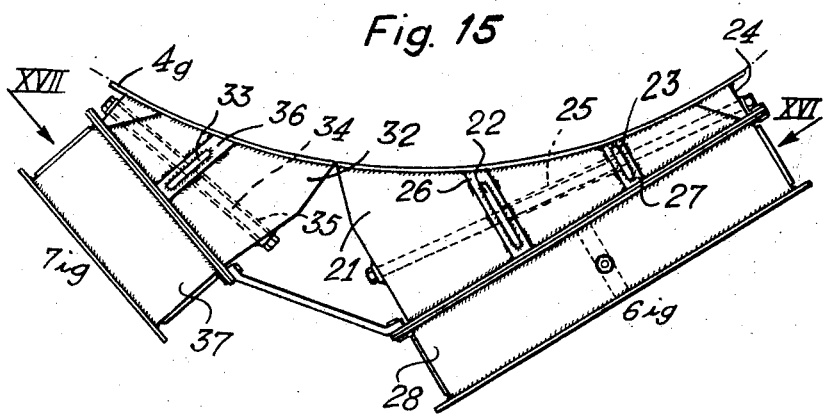
FIG. 15 is a frontal view of the lower ejection ducts of the port jet engine of the aircraft in FG. 8, in accordance with a different embodiment of the invention.
Figure 16:
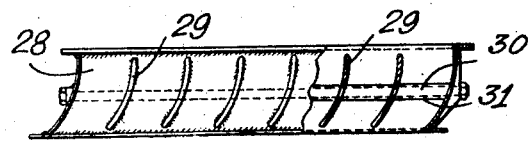
FIG. 16 is an external view partially cut away, in the direction of the arrow XVI in FIG. 15, of the portion of the main lower ejection duct provided with deflecting vanes.
Figure 17:
FIG. 17 is an external view partially cut away, in the direction of the arrow XVII of FIG. 15, of the portion of the secondary lower ejection duct provided with deflecting vanes.

In the embodiment illustrated in FIGS. 15 through 17, the lower deflecting outlets of the port jet engine $4g$ comprise a duct $21$ in which are mounted two deflecting vanes $22$ and $23$ located centrally by means of a threaded rod $24$ and cross-pieces $25$ and inclined at an angle $\gamma$ relative to the vertical plane through the jet engine axis. These vanes project outside the duct $21$ and are secured by welding to reinforcements $26$ and $27$ welded to the duct. This duct opens into a vane-box $28$ comprising a set of directional vanes $29$ to which the vanes $22$ and $23$ are substantially perpendicular and which are centrally located by a threaded rod $30$ and cross-pieces $31$, these vanes projecting from the box $28$ and being thereto fixed by welding. Said vanes $29$ are substantially inclined forwardly at an angle $\delta$ relative to a vertical plane perpendicular to the longitudinal plane of symmetry of the aircraft. This assembly constitutes the outlet $6ig$.

A further duct $32$ is provided with a deflecting vane $33$ centrally located by a threaded rod $34$ and cross-pieces $35$ and, at its two extremities, by welding on a reinforcement $36$ which is itself welded to the outside of the duct $32$, said vane $33$ being inclined at an angle $\epsilon$ relative to the vertical plane through the jet engine axis. This duct is extended by a vane box $37$ comprising a set of vanes $38$ projecting therefrom and whose extremities are fixed by welding on said box $37$, said vane $33$ having a direction substantially perpendicular to that of vanes $38$. The vanes $38$ are substantially inclined rearwardly at an angle $\eta$ relative to a vertical plane perpendicular to the longitudinal plane of symmetry of the aircraft. This assembly constitutes the outlet $7ig$.

FIGS. 18 and 19 represent one possible obturation method well-known per se for the jet-deflecting outlets of the jet engine illustrated in FIG. 8 or 15. The thrust reverser consists of a substantially cylindrical part 39 secured between the outlet casing 40 of the jet engine and its tail-pipe 41. This part is provided with orifices aligned with the deflection outlets about which are mounted ducts 42 provided with vane grids 43 capable of deflecting the jets. On the part 39 is centrally mounted a shaft 44 which passes through it. Inside the part 39 the shaft 44 carries two eyelid-shaped members 45 and 46 having a development and shape which permit obturation of the orifices provided in said part and leading to the upper outlet 5 and the lower outlets 6 and 7 as shown in FIG. 18, or, alternatively, clearing of these outlets with simultaneous obturation of the normal ejection pipe 41, as shown in FIG. 19.

These eyelid-shaped members are operated by a double-acting jack 47 fixed at 48—49 on the outside of tail-pipe 41 and by a rod 50 fixed to the shaft 44. The rod 51 of the jack plunger carries a roller 52 travelling in a slideway 53. A dual connecting-rod system 54, 55 and 56 joins this roller to two levers 57 and 58 mounted on the shaft 44 and actuating the eyelid-shaped members 45 and 46. Under normal thrust conditions, these members obturate the upper orifice 5 and the lower orifices 6 and 7, so that the thrust reverser then simply forms a section of the ejection pipe. With thrust reversal in operation, the eyelid-shaped members obturate the ejection pipe and uncover apertures 5, 6 and 7 in the deflecting ejection ducts.

The thrust reverser of the type described above with reference to FIGS. 1 and 2 and 7 through 19 can be used on aircraft on which the jet engines are mounted in a different way from those equipping the one shown in FIGS. 1 and 2.

Thus, in the case of an aircraft such as shown in FIGS. 3 and 4 equipped with two pairs of lateral jet engines 59g, 60g and 59d, 60d carried on outriggers 61g and 61d respectively, each of these jet engines can be equipped with a thrust reversing device of asymmetrical ejection pattern as described above, comprising upper deflecting outlets generating jets 62g, 63g, 62d and 63d and a pair of lower outlets generating jets 64g, 65g and 64d, 65d for the outboard jet engines 59g and 59d and jets 66g, 67g and 66d, 67d for the inboard jet engines 60g and 60d. The upper jets are similar to the upper jets 10, the lower jets 64 and 66 to the lower main jets 11, the lower jets 65g and 67g to the lower compensating jets 12g and the lower jets 65d and 67d to the lower compensating jets 12d. However the horizontal projections of the lower main jets 66g and 66d for the inboard jet engines 60g and 60d form with the longitudinal plane of symmetry of the aircraft an angle greater than that formed with said plane by the horizontal projections of the lower main jets 64g and 64d of the outboard jet engines 59g and 59d so that their intersection zones with the ground are located outwards laterally to said outboard jet engines 59g and 59d.

In cases where an aircraft comprises a fuselage 1a equipped with wings 68g and 68d mounting jet engines 69g and 69d respectively, as shown in FIGS. 5 and 6, each such jet engine can be equipped with a thrust reverser with asymmetrical ejection pattern of the type described precedingly wherein the upper outlet gives rise to a jet 70g (or 70d), the lower outboard outlet to a main jet 71g (or 71d) and the lower inboard outlet to a compensating jet 72g (or 72d), the latter two jets being directed in a rearward and forward direction respectively.

According to the invention the deflected jets are inclined with respect to the ground in order to avoid re-injection of the expended gases or the intake of small objects that might be on the ground.

Further, in order to balance the applied forces about the longitudinal axis of the engine it is necessary that the lateral components of the jets be equilibrated. Furthermore, the vertical components of the jets must also be balanced so that only a resultant force extending along the engine axis is developed. This is necessary both in the case of a single-jet aircraft, so as to avoid, during the use of the reversing device, the appearance of a torque about the longitudinal axis of the aircraft, and in the case of multi-jet aircraft, to avoid, if one of the engines develops trouble, the appearance of a torque of the same kind generated by the other jet engine or engines. It is the function of the lower compensating ejection means which, for each jet engine, equilibrates the lateral thrust generated by the corresponding upper and main lower ejection means, so that said jet engine is balanced about its own longitudinal axis.

In the case of multi-jet aircraft, the multiple engines could not balance one another with respect to lateral forces. Aside from the question of engine failure, which would result in a substantial unbalance of the aircraft, it would be necessary to design the engine supports to the aft fuselage to resist the combined effect of the lateral and longitudinal forces developed by each engine. This would result in increased weight which, of course, in modern jet aircraft is to be avoided since this reduces its payload and performance.

Finally, the thrust reverser according to the present invention may be used, regardless of the means utilized for mounting the jet engine or engines, for instance it may be utilized on jet engines which are mounted in the fuselage or on pylons.

It is to be clearly understood that many modifications can be made to the embodiments described hereinabove without departing from the scope of the invention as defined in the appended claims. Thus the thrust reverser may be of an entirely different type and be mounted at the outlet extremity of the jet engine tailpipe or be incorporated in the tailpipe itself.

What we claim is:

1. A thrust reverser for a jet engine adapted for use on an aircraft, the reverser comprising three ejection means for deflecting combustion gases from the engine asymmetrically with respect to said engine, each of the ejection means respectively comprising means defining an outlet for the combustion gases and a plurality of gas deflecting vanes for directing said gases obliquely with respect to said engine through the outlet, said engine developing a resultant thrust which is directed forwardly along a longitudinal axis through said engine, with said gases flowing through said outlets, and means for selectively directing said gases to said outlets, one of said ejection means being an upper ejection means and located at a level higher than that of the jet engine axis for directing said gases forwardly of said engine, both of the other ejection means being disposed at levels lower than that of said axis and having different outflows of gases, the lower means which has the greater outflow of gases constituting a main lower ejection means and directing said gases forwardly and laterally, while the other of said lower ejection means constitutes a lower compensating ejection means for directing said gases laterally to equilibrate the lateral thrust generated by the asymmetry of the main lower and upper ejection means whereby the resultant thrust of said three ejection means does not have a component lying in a plane inclined with respect to the engine axis so that balance of the jet engine around the axis thereof is obtained.

2. A thrust reverser of asymmetrical ejection pattern for each of a pair of jet engines respectively mounted laterally on either side of the fuselage of an aircraft, and adjacent thereto, each reverser comprising: three ejection means for deflecting combustion gases of the respective engine asymmetrically with respect to said engine; each of said ejection means defining an outlet and a plurality of gas deflecting vanes for directing said gases through said outlet obliquely with respect to said engine and in a path clear of the aircraft; each engine developing a resultant thrust which is directed forwardly along a longitudial axis through said engine, with said gases flowing through said outlets; each reverser further comprising means for selectively directing said gases to the outlet thereof, one of said ejection means constituting an upper ejection means and being disposed at a level higher than that of said jet engine axis and lying in a plane inclined with respect to a vertical plane passing through said axis, both the other ejection means being disposed at levels lower than that of said axis and adapted for having different outflows of combustion gases to develop different magnitudes of thrust, one of the lower ejection means having the greater outflow of gases and constituting a main lower ejection means for directing a main lower deflected jet outboard of the fuselage, the other lower ejection means constituting a compensating lower ejection means which directs a compensating lower deflected jet substantially inboard of said fuselage to equilibrate lateral thrust generated by the asymmetry of the upper and main lower ejection means.

3. A thrust reverser of asymmetrical ejection pattern for each engine of two pairs of jet engines, each pair being disposed in a common horizontal plane and being laterally mounted on opposite sides of the fuselage of an aircraft and adjacent said fuselage, the thrust reverser of each engine comprising three ejection means for deflecting combustion gases of the corresponding engine asymmetrically with respect to said engine, the directions and the flow of the deflected gases being inclined with respect to the longitudinal axis of the engine, said deflected gases lying in a path clear of said aircraft, the deflected gases which pass through the ejection means of each engine providing a resultant force directed forwardly along the corresponding engine axis, the deflected gases having laterally equilibrated components, one of said ejection means constituting an upper ejection means disposed at a level higher than that of the jet engine axis and lying in a plane inclined with respect to a vertical plane passing through said axis, both other ejection means of each engine being disposed at levels lower than that of said axis of the associated engine and adapted for having different outflows of gases to develop different magnitudes of thrust, one of the lower ejection means having a greater outflow of gases and constituting a main lower deflected ejection means for directing a jet outboard of the fuselage, the other ejection means constituting a compensating lower ejection means which directs a deflected jet inboard of said fuselage to equilibrate the lateral components of the gases in the deflected jets of the main lower and upper ejection means, the compensating lower ejection means for the jet engines of a lateral pair of engines having axes which are slightly directed forwardly while those of the compensating lower deflected ejection means of the other lateral pair are slightly directed rearwardly to avoid interaction of the jets beneath the fuselage, the horizontal projection of the axis of the main lower ejection means of the inboard jet engine in each pair forming with the longitudinal plane of symmetry of the aircraft an angle greater than that formed with the corresponding horizontal projection of the axis of the main lower ejection means of the outboard engine in said pair so that the gas directed along said axis of the main lower ejection means of the inboard jet engine in each pair intersects the ground with said aircraft thereon in a location which is outboard of the outboard jet engine.

4. A thrust reverser according to claim 1 in which said engine is cantilevered laterally from said aircraft and wherein the main lower ejection means directs said gases outboardly of said aircraft.

5. A thrust reverser according to claim 4 wherein said upper ejection means directs said gas forwardly of said engine and inboardly of said aircraft, and said lower compensating ejection means directs said gases in a direction having a component directed longitudinally of said aircraft and a component directed inboardly.

6. A thrust reverser according to claim 5 wherein the gases directed from the main lower ejection means have a greater forwardly inclination with respect to a plane perpendicular to the engine axis than that of the gases directed from said lower compensating ejection means.

7. A thrust reverser according to claim 5 wherein the outlets of said means have determinable cross-sections of different size, the outlets of said upper means having the largest cross-section and the outlets of the compensating lower means having the smallest cross-section.

8. A thrust reverser according to claim 2, wherein the upper ejection means has a forwardly directed axis lying in a plane which is inclined towards the aircraft, the main lower ejection means having a forwardly directed axis lying in a plane which is inclined away from the aircraft, the compensating lower deflected ejection means having an axis inclined relative to a vertical plane and located in a plane which is inclined towards said aircraft, the axis of the compensating lower ejection means for one jet engine being slightly directed forwardly and that of the compensating lower ejection means for the other jet engine being slightly disposed rearwardly to avoid interaction of the corresponding deflected jets beneath the fuselage.

9. A thrust reverser according to claim 8, wherein, for each jet engine, the angle of inclination of the axis of the compensating lower ejection means relative to a vertical plane at right angles to the aircraft longitudinal plane of symmetry is smaller than that of the main lower ejection means relative to said vertical plane.

10. A thrust reverser according to claim 8, wherein, for each jet engine the outlets of said means have determinable cross-sections of different size, the outlets of said upper means having the largest cross-section and the outlets of the compensating lower means having the smallest cross-section.

11. A thrust reverser according to claim 8 wherein the angles of the inclined planes containing the axes of the upper, main lower and compensating lower ejection means relative to the vertical planes through the jet engine axes and the angles of inclination of said axes in said inclined planes are respectively equal for both jet engines.

References Cited in the file of this patent

UNITED STATES PATENTS

| | | |
|---|---|---|
| 2,780,058 | Beale et al. | Feb. 5, 1957 |
| 2,847,823 | Brewer | Aug. 19, 1958 |
| 2,863,620 | Vautier | Dec. 9, 1958 |
| 2,955,417 | Brown | Oct. 11, 1960 |
| 2,960,822 | Bertin | Nov. 22, 1960 |